United States Patent
Soneda et al.

(10) Patent No.: US 10,778,455 B2
(45) Date of Patent: Sep. 15, 2020

(54) CONFERENCE SYSTEM, INFORMATION TRANSMISSION METHOD, AND STORAGE MEDIUM

(71) Applicants: Takuya Soneda, Kanagawa (JP); Naoki Umehara, Kanagawa (JP); Atsushi Miyamoto, Kanagawa (JP); Takeshi Horiuchi, Tokyo (JP); Hiroshi Hinohara, Kanagawa (JP)

(72) Inventors: Takuya Soneda, Kanagawa (JP); Naoki Umehara, Kanagawa (JP); Atsushi Miyamoto, Kanagawa (JP); Takeshi Horiuchi, Tokyo (JP); Hiroshi Hinohara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 57 days.

(21) Appl. No.: 16/129,962

(22) Filed: Sep. 13, 2018

(65) Prior Publication Data

US 2019/0013956 A1 Jan. 10, 2019

Related U.S. Application Data

(63) Continuation of application No. PCT/JP2017/011855, filed on Mar. 23, 2017.

(30) Foreign Application Priority Data

Mar. 28, 2016 (JP) .................................. 2016-063751

(51) Int. Cl.
*H04L 12/18* (2006.01)
*G06F 13/00* (2006.01)
(Continued)

(52) U.S. Cl.
CPC .......... *H04L 12/1822* (2013.01); *G06F 13/00* (2013.01); *H04L 12/1818* (2013.01);
(Continued)

(58) Field of Classification Search
CPC ......... G06F 13/00; H04N 7/15; H04L 65/403; H04L 65/1069; H04L 63/0807;
(Continued)

(56) References Cited

U.S. PATENT DOCUMENTS

2005/0216565 A1 9/2005 Ito et al.
2006/0168043 A1* 7/2006 Eisenberger .......... G06F 19/326
709/206

(Continued)

FOREIGN PATENT DOCUMENTS

| JP | 2005-277806 | 10/2005 |
| JP | 2012-252699 | 12/2012 |

(Continued)

OTHER PUBLICATIONS

International Search Report dated Jun. 13, 2017 in PCT/JP2017/011855 filed on Mar. 23, 2017.

(Continued)

*Primary Examiner* — Abdullahi E Salad
(74) *Attorney, Agent, or Firm* — IPUSA, PLLC

(57) ABSTRACT

A conference system includes a management system connected via a network to a first communication terminal and a second communication terminal. The management system includes a processing circuitry configured to implement a generation unit configured to generate a topic in response to a conference topic issuance request made by a first user to hold a conference between the first communication terminal and the second communication terminal; and an authorization unit configured to authorize the first user to perform publication and subscription for the topic in response to the conference topic issuance request made by the first user, and to authorize a second user to perform publication and subscription for the topic in response to an invitation request made by the first user to invite the second user to the (Continued)

conference, the invitation request including a topic name indicating a message for the second user.

8 Claims, 12 Drawing Sheets

(51) Int. Cl.
    *H04N 7/15*     (2006.01)
    *H04L 29/06*     (2006.01)
    *H04W 12/06*     (2009.01)

(52) U.S. Cl.
    CPC ...... *H04L 12/1831* (2013.01); *H04L 63/0807* (2013.01); *H04L 65/1069* (2013.01); *H04L 65/403* (2013.01); *H04N 7/15* (2013.01); *H04W 12/06* (2013.01)

(58) Field of Classification Search
    CPC ............. H04L 12/1818; H04L 12/1822; H04L 12/1831; H04W 12/06
    USPC .......................................................... 709/204
    See application file for complete search history.

(56) References Cited

U.S. PATENT DOCUMENTS

| | | | | |
|---|---|---|---|---|
| 2007/0091834 | A1* | 4/2007 | Lee | .................... H04B 7/15521 370/310 |
| 2007/0245018 | A1 | 10/2007 | Bhola et al. | |
| 2008/0103854 | A1* | 5/2008 | Adam | ................. G06F 21/6218 705/344 |
| 2009/0268009 | A1 | 10/2009 | Oya | |
| 2012/0260159 | A1* | 10/2012 | Lazier | ................... G06F 3/1415 715/234 |
| 2012/0311052 | A1 | 12/2012 | Lee et al. | |
| 2013/0239024 | A1* | 9/2013 | Lewis | .................... H04N 7/147 715/756 |
| 2013/0290434 | A1* | 10/2013 | Bank | ...................... G06Q 10/10 709/206 |
| 2014/0033274 | A1 | 1/2014 | Okuyama | |
| 2014/0380429 | A1 | 12/2014 | Matsugashita | |
| 2015/0026261 | A1 | 1/2015 | Shimakawa | |
| 2015/0111553 | A1 | 4/2015 | Efrati et al. | |
| 2016/0125451 | A1* | 5/2016 | Garg | .................. G06Q 30/0243 705/14.42 |
| 2017/0180289 | A1* | 6/2017 | Chiappone | .............. H04L 67/22 |

FOREIGN PATENT DOCUMENTS

| | | |
|---|---|---|
| JP | 5160134 | 3/2013 |
| JP | 2014-027433 | 2/2014 |
| WO | 2013/145518 | 10/2013 |

OTHER PUBLICATIONS

Extended European Search Report for 17774714.4 dated Feb. 20, 2019.

* cited by examiner

FIG.6A

| USER ID | USER NAME | PASSWORD |
|---------|-----------|----------|
| U01 | a | abc |
| U02 | b | def |
| U03 | c | ghi |
| ... | ... | ... |

FIG.6B

| CLIENT ID | CLIENT NAME | PASSWORD |
|-----------|-------------|----------|
| C01 | VIDEO CONFERENCE APPLICATION | aaaa |
| C02 | RELAY MANAGEMENT APPLICATION | bbbb |
| ... | ... | ... |

FIG.6C

| SERVICE ID | SERVICE NAME |
|------------|--------------|
| S01 | TRANSMISSION MANAGEMENT SYSTEM |
| ... | ... |

FIG.6D

| CLIENT ID | SERVICE ID |
|-----------|------------|
| C01       | S01        |
| C02       | S02        |
| ...       | ...        |

— # CONFERENCE SYSTEM, INFORMATION TRANSMISSION METHOD, AND STORAGE MEDIUM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/011855, filed on Mar. 23, 2017, which is based on and claims priority to Japanese Patent Application No. 2016-063751 filed on Mar. 28, 2016, the entire contents of which are incorporated herein by reference.

BACKGROUND OF THE INVENTION

1. Field of the Invention

An aspect of this disclosure relates to a conference system, an information transmission method, and a storage medium.

2. Description of the Related Art

Communication systems for making phone calls and holding conferences via communication networks such as the Internet and private lines have become popular along with demands to reduce traveling expenses and time of personnel. In such a communication system, when communication is started between communication terminals, content data such as image data and sound data are exchanged to enable communications between parties. Also, a publish-subscribe model (hereafter referred to as a pub-sub model) is known as a method for transmission of content data between communication terminals.

For example, Japanese Patent No. 5160134 discloses a method for providing access control in a content-based publish system or a content-based subscribe system for delivering messages from publisher clients to subscriber clients via multiple routing broker machines. In this method, each routing broker machine selects a starting point at which a new access control rule is established. Messages before the starting point are delivered to clients only when the messages satisfy a subscription filter and an access filter provided before a change associated with an access control version identifier. On the other hand, messages after the starting point are delivered to clients when the messages satisfy both of a subscription filter and an access filter provided after the change associated with the access control version identifier.

SUMMARY OF THE INVENTION

According to an aspect of this disclosure, there is provided a conference system that includes a management system connected via a network to a first communication terminal and a second communication terminal. The management system includes a processing circuitry configured to implement a generation unit configured to generate a topic in response to a conference topic issuance request made by a first user to hold a conference between the first communication terminal and the second communication terminal; and an authorization unit configured to authorize the first user to perform publication and subscription for the topic in response to the conference topic issuance request made by the first user, and to authorize a second user to perform publication and subscription for the topic in response to an invitation request made by the first user to invite the second user to the conference, the invitation request including a topic name indicating a message for the second user.

BRIEF DESCRIPTION OF THE DRAWINGS

FIG. 6A is a user management table managed by an authentication server;

FIG. 6B is a client management table managed by an authentication server;

FIG. 6C is a service management table managed by an authentication server;

FIG. 6D is a service authorization management table managed by an authentication server;

DESCRIPTION OF THE EMBODIMENTS

Embodiments of the present invention are described below with reference to the accompanying drawings.

<<Outline of Communication System>>

Figure 1:
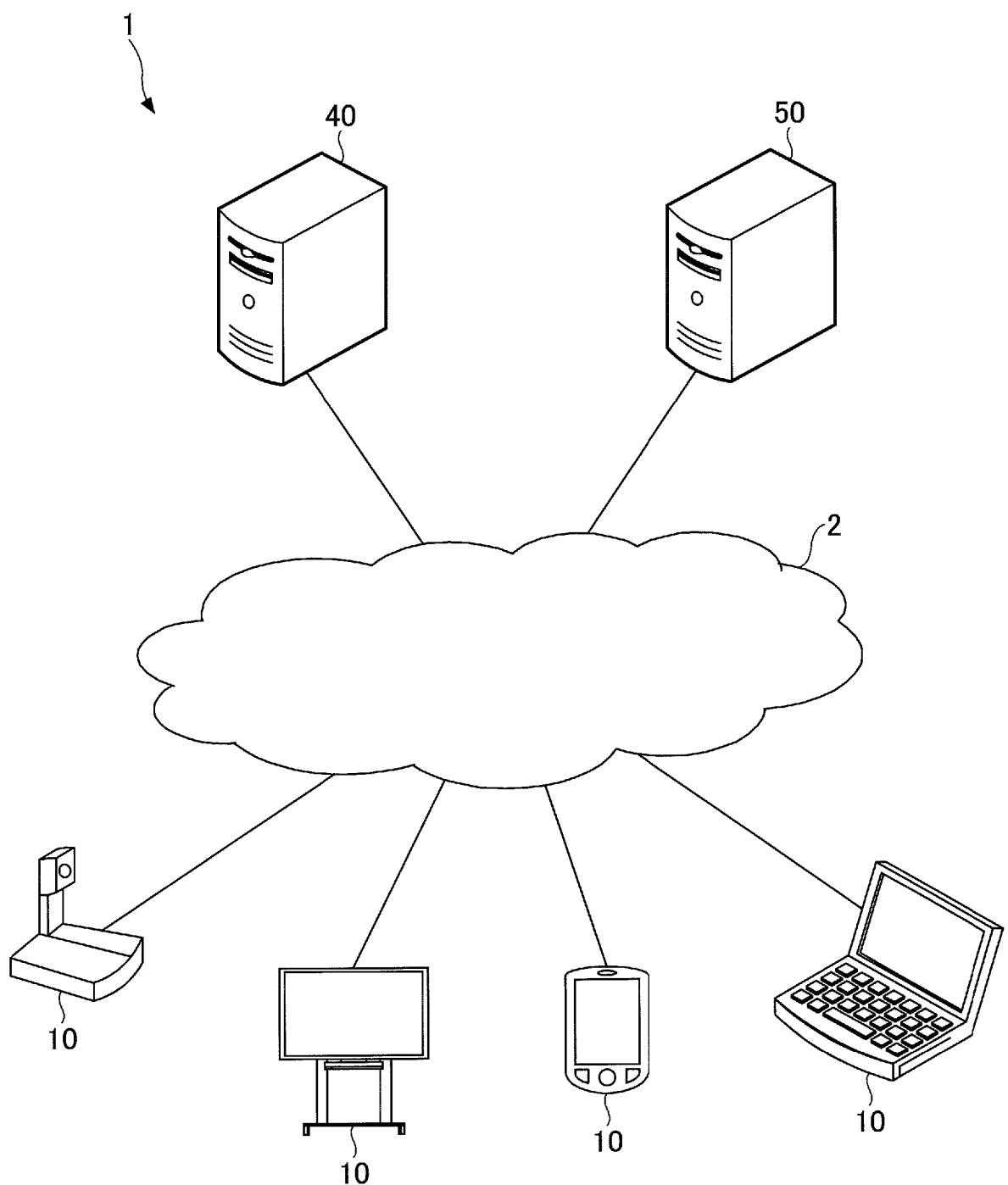
FIG. 1 is a schematic diagram of a communication system according to an embodiment of the present invention.

FIG. 1 is a schematic diagram of a communication system according to an embodiment of the present invention. As illustrated in FIG. 1, a communication system 1 (an example of a conference system) includes communication terminals 10, an authentication server 40, and a management system 50. Hereafter, each communication terminal 10 is simply referred to as a terminal 10.

For exchange of messages between clients in a publish-subscribe (hereafter referred to as "pub-sub") model, the management system 50 receives, from clients, requests for publication of messages (pub requests) and requests for subscription of messages (sub requests). The management system 50 may use, for example, MQ Telemetry Transport (MQTT) or a pub-sub extension (XEP-0060) of Extensible Messaging and Presence Protocol (XMPP) as a protocol supporting the pub-sub model (pub-sub pattern).

The terminal 10 is, for example, a general-purpose terminal in which a client application is installed. The terminal 10 may also be a dedicated terminal including a specific client application that functions as a client. Because the terminal 10 is communicably connected to the management system 50 via a communication network 2, the client can send requests to publish and subscribe messages to the management system 50. For example, the terminal 10 may be a video conference terminal, an electronic whiteboard, an electronic signboard, a telephone, a tablet, a smartphone, a camera, or a personal computer (PC).

The authentication server 40 authenticates a "client" which is a client application running on the terminal 10 and a "user" who uses the client to authorize the use of the management system 50. The management system 50 employs authentication and authorization protocols such as OAuth 2.0 and OpenID Connect to perform authentication and authorization described above.

In FIG. 1, for brevity, it is assumed that each of the management system 50 and the authentication server 40 is implemented by a single apparatus. However, the present invention is not limited to this example. At least one of the management system 50 and the authentication server 40 may be implemented by multiple apparatuses. Also, the management system 50 and the authentication server 40 may be implemented by one system or one apparatus. Also in FIG. 1, for brevity, it is assumed that the communication system 1 includes four terminals 10. However, the present invention is not limited to this example. The number of terminals 10 provided in the communication system 1 may be two, three, five, or more. Also, the terminals 10 may be devices of the same type or may be devices of different types as illustrated in FIG. 1.

<<Hardware Configurations>>

Next, hardware configurations of apparatuses constituting the communication system 1 are described.

Figure 2:
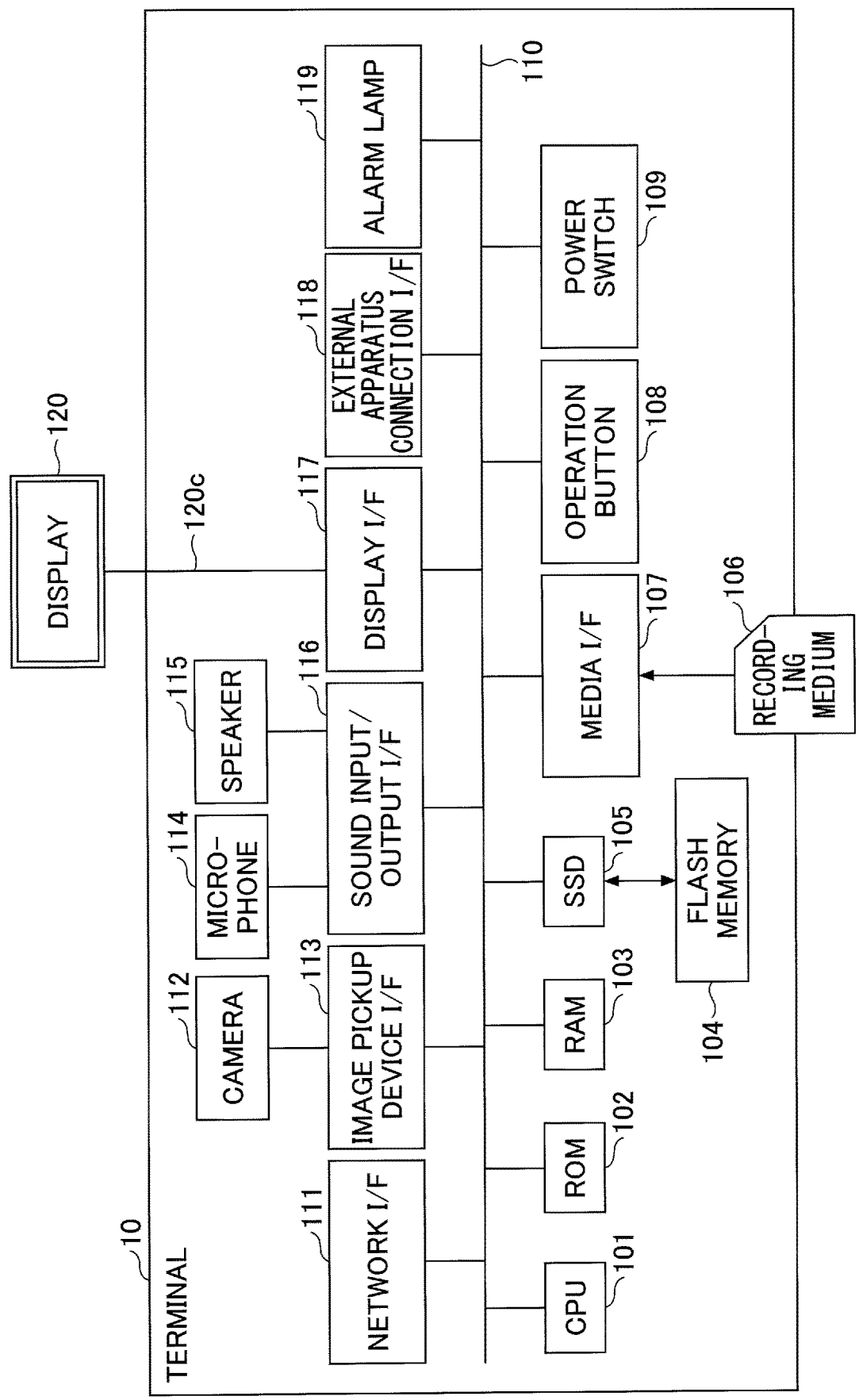
FIG. 2 is a block diagram illustrating a hardware configuration of a terminal according to an embodiment.

FIG. 2 is a block diagram illustrating a hardware configuration of the terminal 10 according to an embodiment. The hardware configuration of the terminal 10 is not limited to the configuration illustrated in FIG. 2 as long as the terminal 10 can perform communications. For example, the terminal 10 may include components not illustrated in FIG. 2 or may not include some of the components illustrated in FIG. 2. Also, some of the components illustrated in FIG. 2 may be implemented as external devices connectable to the terminal 10. As illustrated in FIG. 2, the terminal 10 of the present embodiment includes a central processing unit (CPU) 101 that controls overall operations of the terminal 10, a read-only memory (ROM) 102 that stores a program such as an initial program loader (IPL) for driving the CPU 101, a random access memory (RAM) 103 used as a work area of the CPU 101, a flash memory 104 that stores various terminal programs for the terminal 10 and various types of data such as image data and audio data, a solid-state drive (SSD) 105 that controls reading and writing of various types of data from and into the flash memory 104 under the control of the CPU 101, a media I/F 107 that controls reading and writing (storing) of data from and into a recording medium 106 such as a flash memory or an integrated circuit (IC) card, an operation button 108 that is operated to, for example, select a destination, a power switch 109 for turning on and off the terminal 10, and a network I/F (interface) 111 that performs data transmission via the communication network 2.

The terminal 10 also includes a built-in camera 112 that captures image data of an object under the control of the CPU 101, an image pickup device I/F 113 that controls the camera 112, a built-in microphone 114 that inputs sound, a built-in speaker 115 that outputs sound, a sound input/output I/F 116 that inputs and outputs sound signals from and to the microphone 114 and the speaker 115 under the control of the CPU 101, a display I/F 117 that transmits image data to an external display 120 under the control of the CPU 101, an external apparatus connection I/F 118 for connecting various external apparatuses, an alarm lamp 119 that indicates errors in various functions of the terminal 10, and a bus line 110 such as an address bus or a data bus for electrically connecting the above components to each other as illustrated in FIG. 2.

The display 120 displays, for example, images of objects and operations and is implemented by a liquid crystal display or an organic electroluminescence (EL) display. The display 120 is connected via a cable 120c to the display I/F 117. The cable 120c may be an analog RGB (VGA) signal cable, a component video cable, a high-definition multimedia interface (HDMI) (registered trademark) cable, or a digital video interactive (DVI) signal cable.

The camera 112 includes lenses and a solid-state image sensor that converts light into electric charges to obtain an electronic image (video) of an object. Examples of the solid-state image sensor include a complementary metal oxide semiconductor (CMOS) and a charge coupled device (CCD).

External apparatuses such as an external camera, an external microphone, and an external speaker can be electrically connected to the external apparatus connection I/F 118 via, for example, a universal serial bus (USB) cable inserted into a connection port 1132 of a case 1100. When an external camera is connected to the external apparatus connection I/F 118, the external camera is driven under the control of the CPU 101 in preference to the built-in camera 112. Similarly, when the external microphone or the external speaker is connected to the external apparatus connection I/F 118, the external microphone or the external speaker is driven under the control of the CPU 101 in preference to the built-in microphone 114 or the built-in speaker 115.

The recording medium 106 is detachably attached to the terminal 10. Also, any nonvolatile memory such as an electrically erasable and programmable ROM (EEPROM), from and into which data can be read and written under the control of the CPU 101, may be used instead of the flash memory 104.

Figure 3:
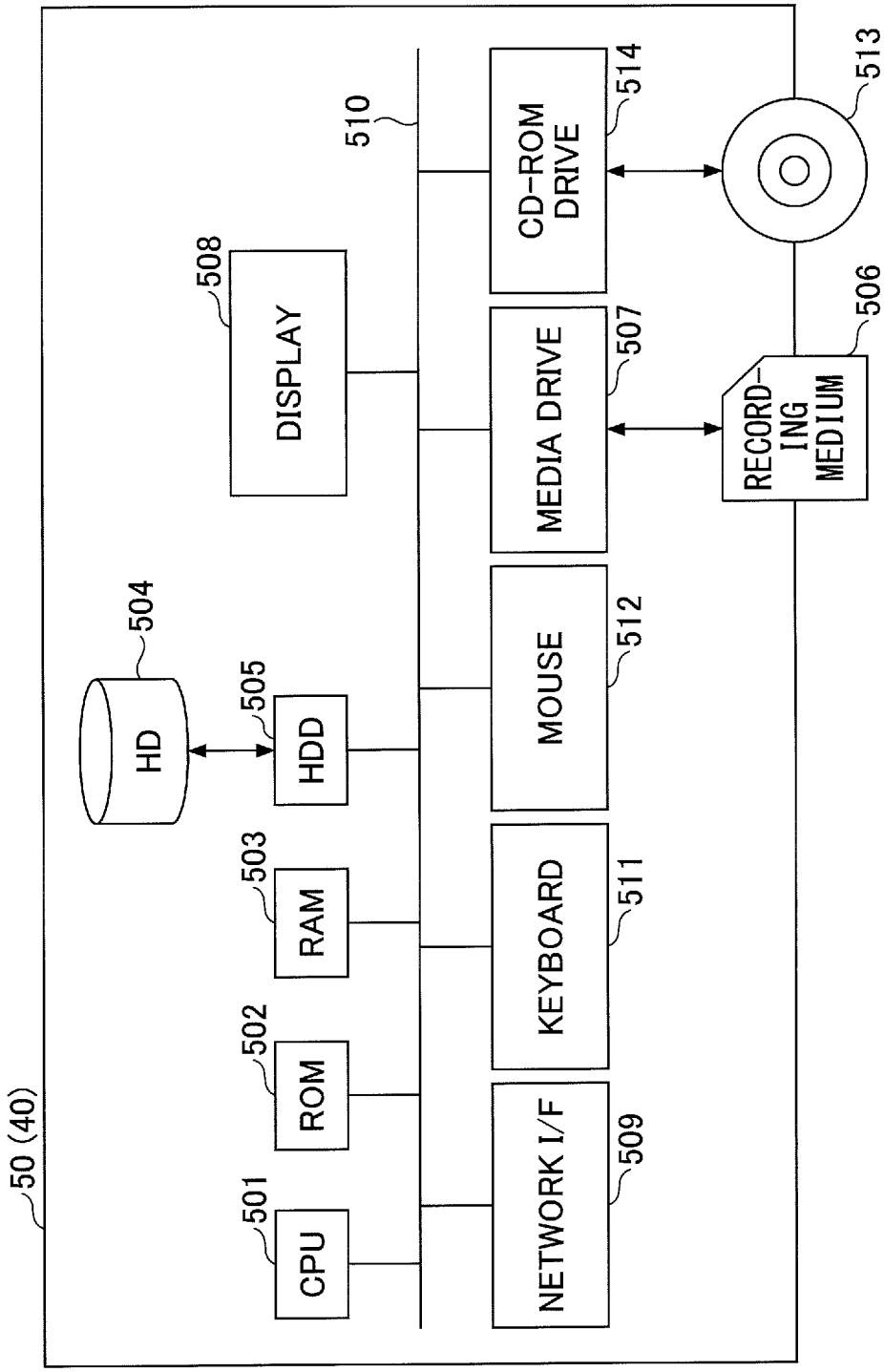
FIG. 3 is a block diagram illustrating a hardware configuration of a management system according to an embodiment.

FIG. 3 is a block diagram illustrating a hardware configuration of the management system 50 according to an embodiment. The management system 50 includes a CPU 501 that controls overall operations of the management system 50; a ROM 502 that stores a program such as an IPL for driving the CPU 501; a RAM 503 used as a work area of the CPU 501; an HD 504 that stores programs and various types of data for the management system 50; a hard disk drive (HDD) 505 that controls reading and writing of various types of data from and into the HD 504 under the control of the CPU 501; a media drive 507 that controls reading and writing (storing) of data from and into a recording medium 506 such as a flash memory; a display 508 that displays various types of information such as a cursor, menus, windows, characters, and images; a network I/F 509 that performs data communication via the communication network 2; a keyboard 511 including multiple keys for inputting characters, numerals, and commands; a mouse 512 for selecting and executing various commands, selecting an object to be processed, and moving a cursor; a CD-ROM drive 514 that controls reading and writing of various types of data from and into a compact disc read-only memory (CD-ROM) 513, which is an example of a removable recording medium; and a bus line 510 such as an address bus or a data bus for electrically connecting the above components to each other as illustrated in FIG. 3. The authentication server 40 has a hardware configuration similar to that of the management system 50, and therefore descriptions of the hardware configuration of the authentication server 40 are omitted.

<<Software Configuration>>

Figure 4:
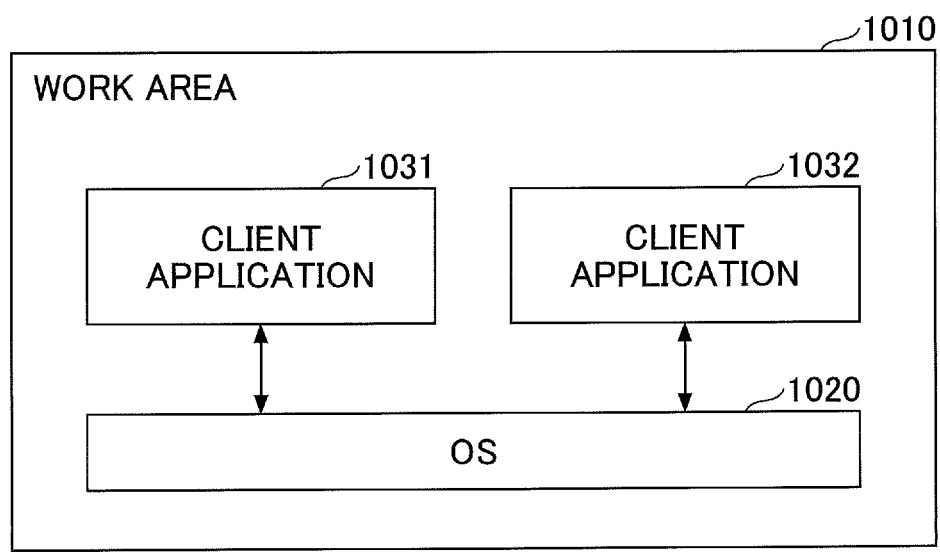
FIG. 4 is a block diagram illustrating a software configuration of a terminal according to an embodiment.

FIG. 4 is a block diagram illustrating a software configuration of the terminal 10 according to an embodiment. As illustrated in FIG. 4, an OS 1020 and client applications (1031 and 1032) run in a work area 1010 of the RAM 103 of the terminal 10. The OS 1020 and the client applications (1031 and 1032) are installed in the terminal 10. The OS 1020 and the client applications (1031 and 1032) are installed in each of the terminals 10 constituting the communication system 1 of the present embodiment.

The OS 1020 is basic software that provides basic functions to the terminal 10 and manages the entire terminal 10. Each of the client applications (1031 and 1032) requests the authentication server 40 to perform authentication and transmits at least one of a pub request and a sub request to the management system 50.

Although two client applications (1031 and 1032) are installed in the terminal 10 in the example of FIG. 4, any number of (one or more) client applications may be installed in the terminal 10. Also, the client applications may run on another application running on the OS 1020.

<<Functional Configurations>>

Figure 5:
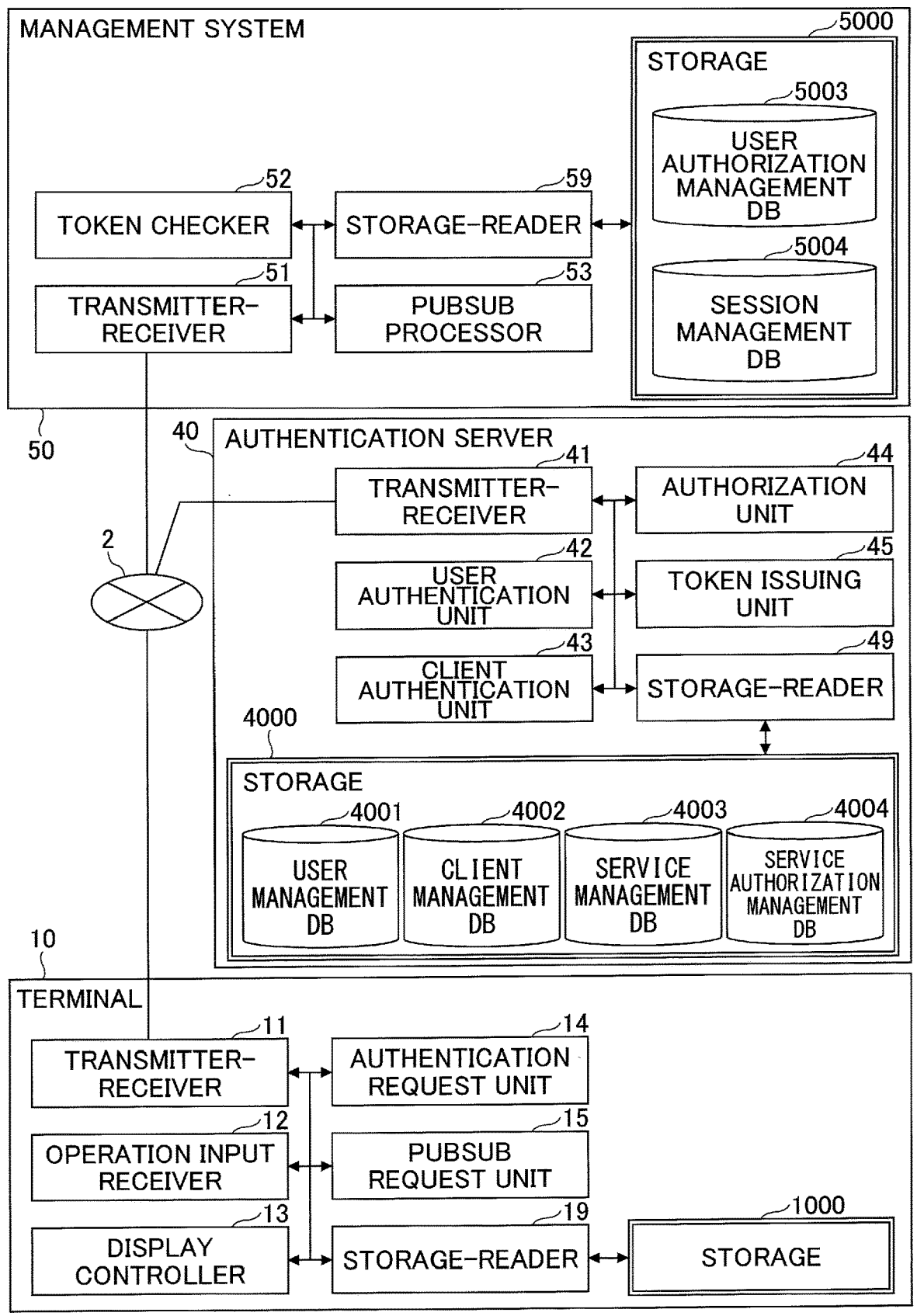
FIG. 5 is a block diagram illustrating functional components of a terminal, an authentication server, and a management system according to an embodiment.

Next, functional configurations of the present embodiment are described. FIG. 5 is a block diagram illustrating functions (components or elements) of the terminal 10, the authentication server 40, and the management system 50 constituting a part of the communication system 1 according to the embodiment. In FIG. 5, the terminal 10, the authentication server 40, and the management system 50 are connected via the communication network 2 to be able to perform data communications with each other.

<Functional Configuration of Terminal>

The terminal 10 includes a transmitter-receiver 11, an operation input receiver 12, a display controller 13, an authentication request unit 14, a pubsub request unit 15, and a storage-reader 19. Each of these functional components is implemented by one or more of the hardware components illustrated in FIG. 2 that are driven by the CPU 101 according to a program loaded from the flash memory 104 onto the RAM 103. The terminal 10 also includes a storage 1000 that is implemented by the ROM 102, the RAM 103, and the flash memory 104 illustrated in FIG. 2.

(Functional Components of Terminal)

Next, the functional components of the terminal 10 are described in detail with reference to FIGS. 2 and 5. In the descriptions of the functional components of the terminal 10 below, major hardware components in FIG. 2 used to implement the functional components of the terminal 10 are also described.

The transmitter-receiver 11 is implemented by instructions from the CPU 101 and the network I/F 111. The transmitter-receiver 11 transmits and receives various types of data (or information) to and from, for example, a terminal, an apparatus, or a system via the communication network 2.

The operation input receiver 12 is implemented by instructions from the CPU 101, the operation button 108, and the power switch 109. The operation input receiver 12 receives various inputs and selections made by a user.

The display controller 13 is implemented by instructions from the CPU 101 and the display I/F 117. The display controller 13 performs a control process for sending, to the display 120, image data received from a counterpart device during a call.

The authentication request unit 14 is implemented by instructions from the CPU 101 and requests the authentication server 40 to perform authentication.

The pubsub request unit 15 is implemented by instructions from the CPU 101 and sends requests for publication and subscription of messages to the management system 50. In other words, the pubsub request unit 15 can request the management system 50 to publish a message for other terminals 10. Also, the pubsub request unit 15 can request the management system 50 to enable the terminal 10 to receive messages published by other terminals 10. In other words, the pubsub request unit 15 can exchange messages with the pubsub request units 15 of other terminals 10 via the management system 50.

The storage-reader 19 is implemented by instructions from the CPU 101 and the SSD 105 or solely by instructions from the CPU 101. The storage-reader 19 stores various types of data in the storage 1000 and retrieves various types of data stored in the storage 1000.

<Functional Configuration of Authentication Server>

The authentication server 40 includes a transmitter-receiver 41, a user authentication unit 42, a client authentication unit 43, an authorization unit 44, a token issuing unit 45, and a storage-reader 49. Each of these functional components is implemented by one or more of the hardware components illustrated in FIG. 3 that are driven by the CPU 501 according to a program for the authentication server 40 loaded from the HD 504 onto the RAM 503. Also, the authentication server 40 includes a storage 4000 implemented by the HD 504.

(User Management Table)

FIG. 6A illustrates a user management table. The storage 4000 stores a user management DB 4001 constructed based on the user management table. The user management table manages a user name and a password in association with each user ID (identifier, identification).

(Client Management Table)

FIG. 6B illustrates a client management table. The storage 4000 stores a client management DB 4002 constructed based on a client management table. The client management table manages a client name and a password in association with each client ID. A video conference application in FIG. 6B is a client application for exchanging (transmitting and receiving) content data such as image data and sound data among multiple users.

(Service Management Table)

FIG. 6C illustrates a service management table. The storage 4000 stores a service management DB 4003 constructed based on the service management table. The service management table manages a service name in association with each service ID. In an embodiment, a service "transmission management system" identified by service ID "S01" corresponds to the management system 50. Here, rights to use publication and subscription functions of the management system 50 are referred to as "resources". Also, a pub-sub service provided by the management system 50 indicates a scope that is a unit of authorization in the OAuth 2.0 protocol. The management system 50 corresponds to a resource server.

(Service Authorization Management Table)

Figure 6D:
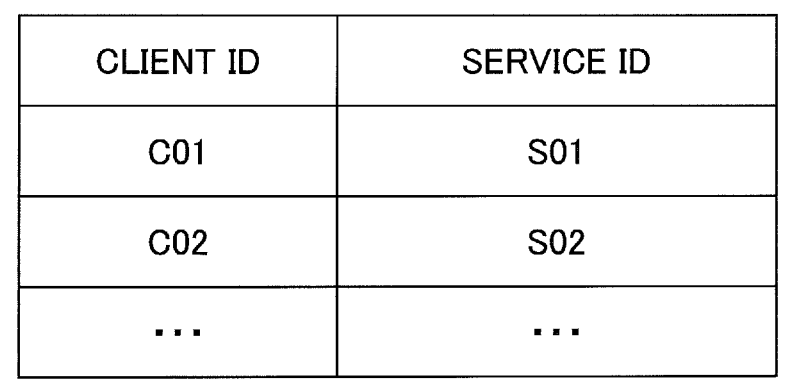

FIG. 6D illustrates a service authorization management table. The storage 4000 stores a service authorization management DB 4004 constructed based on the service authorization management table. The service authorization management table manages a service ID in association with each client ID. Thus, the service authorization management table can manage information indicating services that are accessible and usable by respective clients. According to the service authorization management table illustrated in FIG. 6D, the video conference application identified by client ID "C01" can access and use the transmission management system, i.e., the management system 50, which is identified by service ID "S01".

(Functional Components of Authentication Server)

The transmitter-receiver 41 is implemented by instructions from the CPU 501 and the network I/F 509. The transmitter-receiver 41 transmits and receives various types of data (or information) to and from, for example, a terminal, an apparatus, or a system via the communication network 2.

The user authentication unit 42 is implemented by instructions from the CPU 501 and performs user authentication in response to a request from a client.

The client authentication unit 43 is implemented by instructions from the CPU 501 and performs client authentication in response to a request from a client.

The authorization unit 44 is implemented by instructions from the CPU 501 and authorizes a client to access a service by assigning an access right to the client.

The token issuing unit 45 is implemented by instructions from the CPU 501 and issues an authorization token used by a client to access a service.

The storage-reader 49 is implemented by instructions from the CPU 501 and the HDD 505 or solely by instructions from the CPU 501. The storage-reader 49 stores various types of data in the storage 4000 and retrieves various types of data stored in the storage 4000.

<Functional Configuration of Management System>

The management system 50 includes a transmitter-receiver 51, a token checker 52, a pubsub processor 53, and a storage-reader 59. Each of these functional components is implemented by one or more of the hardware components illustrated in FIG. 3 that are driven by the CPU 501 according to a program for the management system 50 loaded from the HD 504 onto the RAM 503. Also, the management system 50 includes a storage 5000 implemented by the HD 504.

(User Authorization Management Table)

Table 1A illustrates a user authorization management table. The storage 5000 stores a user authorization management DB 5003 constructed based on the user authorization management table. The user authorization management table manages, in association with each topic name indicating a topic, a user name and right information indicating whether a user has a publication (pub) right or a subscription (sub) right for the topic. For example, according to the user authorization management table of Table 1A, a user "a" with a user name "a" has a subscription right for a topic with a topic name "Roster/userA" and has a publication right for a topic with a topic name "Roster/userM". In other words, as illustrated in Table 1A, the user "a" has a right to receive messages issued for the topic with the topic name "Roster/userA" and has a right to publish messages for the topic with the topic name "Roster/userM". In the present embodiment, topic names starting with "Roster" indicate messages whose destinations are users written after "Roster". That is, "Roster/userA" indicates messages for the user "a".

TABLE 1A

| TOPIC NAME | USER NAME | RIGHT INFORMATION |
| --- | --- | --- |
| Roster/userA | a | sub |
| Roster/userB | b | sub |
| Roster/userM | m | sub |
| Roster/userN | n | sub |
| Roster/userA | m | pub |
| Roster/userB | n | pub |
| Roster/userM | a | pub |
| Roster/userN | b | pub |

(Session Management Table)

Table 2A illustrates a session management table. The storage 5000 stores a session management DB 5004 constructed based on the session management table. The session management table manages user names of users currently subscribing topics in sessions established between terminals 10 in association with topic names of the topics.

TABLE 2A

| USER NAME | TOPIC NAME |
| --- | --- |
| x | abcd |
| ... | ... |

(Functional Components of Management System)

Next, functional components of the management system 50 are described in detail. In the descriptions of the functional components of the management system 50 below, major hardware components in FIG. 3 used to implement the functional components of the management system 50 are also described.

The transmitter-receiver 51 is implemented by instructions from the CPU 501 and by the network I/F 509. The transmitter-receiver 51 is configured to transmit and receive various data (or information) with respect to each terminal, apparatus, or system via the communication network 2.

The token checker 52 is implemented by instructions from the CPU 501 and checks an authorization token included in a login request from the terminal 10.

The pubsub processor 53 is implemented by instructions from the CPU 501 and executes processes regarding pub requests and sub requests from clients.

The storage-reader 59 is implemented by instructions from the CPU 501 and the HDD 505 or solely by instructions from the CPU 501. The storage-reader 59 stores various types of data in the storage 5000 and retrieves various types of data stored in the storage 5000.

<<Processes and Operations>>

Figure 7:
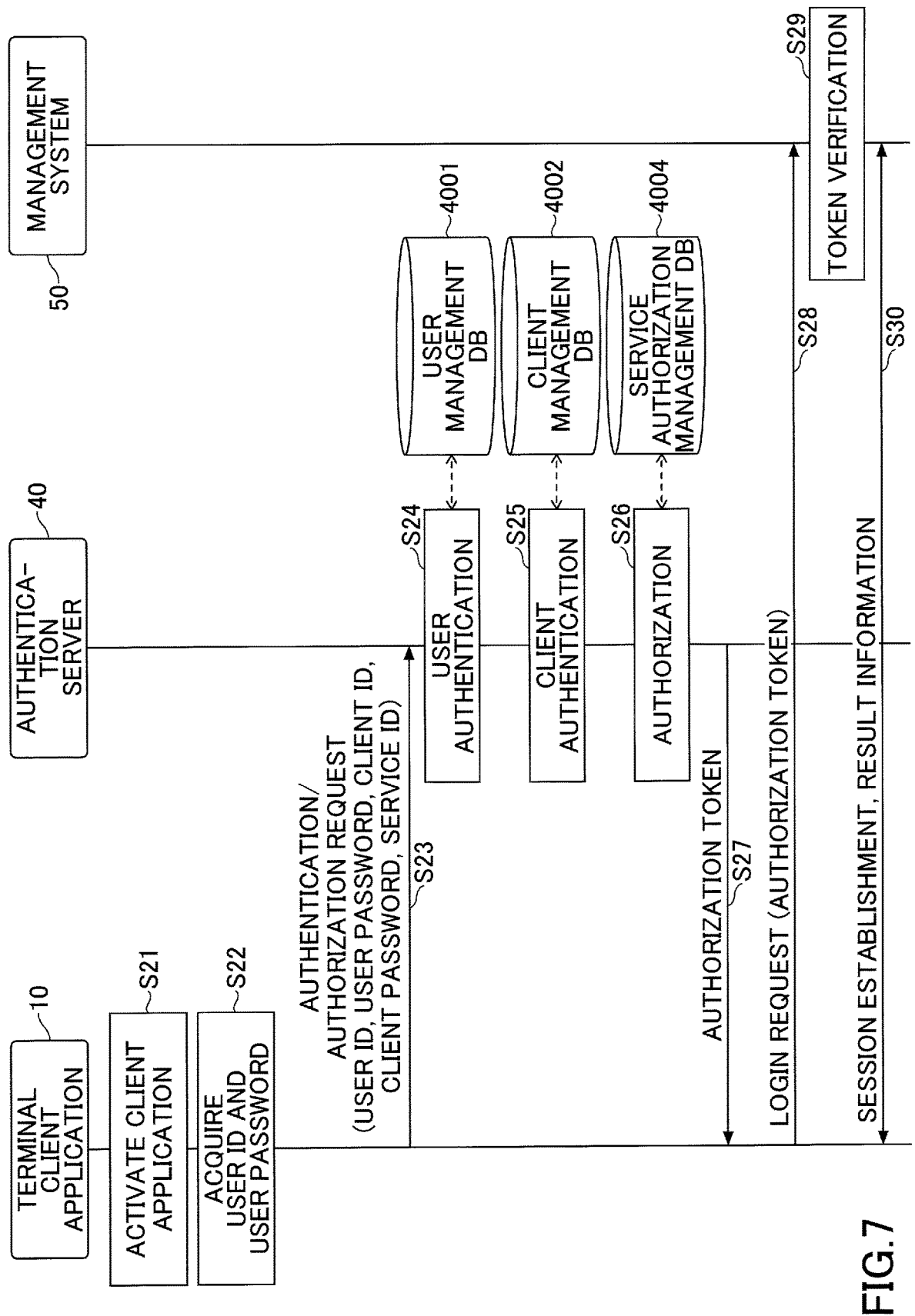
FIG. 7 is a sequence chart illustrating an authentication process according to an embodiment.

Next, processes and operations performed by the terminal 10, the authentication server 40, and the management system 50 constituting the communication system 1 are described. First, an authentication process according to an embodiment is described with reference to FIG. 7. FIG. 7 is a sequence chart illustrating an authentication process according to an embodiment.

When a client application installed in the terminal 10 is activated (step S21), a process described below is started by functional components corresponding to the activated client application. The client application of the terminal 10 acquires a user ID and a user password of a user (step S22). The user ID and the user password may be acquired by any appropriate method. For example, the operation input receiver 12 may receive a user ID and a password entered by a user, or the storage-reader 19 may reads a user ID and a password stored in advance in the storage 1000.

The authentication request unit 14 of the terminal 10 transmits an authentication (/authorization) request to the authentication server 40 via the transmitter-receiver 11 (step S23). The authentication (/authorization) request includes a user authentication request, a client authentication request, and a service access authorization request. The authentication request transmitted to the authentication server 40 includes a user ID and a user password acquired at the terminal 10, a client ID and a client password of the activated client application, and a service ID as a scope indicating a service to be used. The client ID and the client password may be stored in advance in the storage 1000 and read by the storage-reader 19. In the descriptions below, it is assumed that the service ID included in the authentication request is "S01" indicating the management system 50.

The transmitter-receiver 41 of the authentication server 40 receives the authentication request from the terminal 10. The user authentication unit 42 of the authentication server 40 performs user authentication based on whether the combination of the user ID and the user password included in the authentication request exists in the user management table (see FIG. 6A) (step S24). When the combination of the user ID and the user password in the authentication request exists in the user management table, the user authentication unit 42 determines that the user authentication has succeeded. When the combination of the user ID and the user password in the authentication request does not exist in the user management table, the user authentication unit 42 determines that the user authentication has failed.

Also, the client authentication unit 43 of the authentication server 40 performs client authentication based on whether the combination of the client ID and the client password included in the authentication request exists in the client management table (see FIG. 6B) (step S25). When the combination of the client ID and the client password in the authentication request exists in the client management table, the client authentication unit 43 determines that the client authentication has succeeded. When the combination of the client ID and the client password in the authentication request does not exist in the client management table, the client authentication unit 43 determines that the client authentication has failed.

Further, the authorization unit 44 of the authentication server 40 determines whether to authorize an access by the requesting client to the service based on whether the combination of the client. ID and the service ID included in the authentication request exists in the service authorization management table (see FIG. 6D) (step S26). When the combination of the client ID and the service ID in the authentication request exists in the service authorization management table, the authorization unit 44 determines that the authorization has succeeded. When the combination of the client ID and the service ID in the authentication request does not exist in the service authorization management table, the authorization unit 44 determines that the authorization has failed.

When at least one of the user authentication, the client authentication, and the service authorization fails, the transmitter-receiver 41 transmits an error message indicating that the authentication or the authorization has failed to the requesting terminal 10.

When all of the user authentication, the client authentication, and the service authorization succeed, the token issuing unit 45 of the authentication server 40 issues an authorization token indicating that the terminal 10 requesting the authentication can access the management system 50 (step S27). The authorization token includes the user name, the client name, the service name for which the authorization token is used, and an expiration period of the authorization token.

In the communication system 1, authentication and authorization may also be performed using protocols such as OAuth 2.0 and OpenID Connect. In this case, the method for sending and receiving authentication information such as a user ID and a user password and information included in an authorization token are defined by the specifications of OAuth 2.0 and OpenID Connect. Also in this case, the token itself may be a JSON Web Token (JWT). To ensure that the authorization token is not tampered with in the route, the token issuing unit 45 may sign the authorization token using a private key. The private key may be based on RSA (Rivest, Shamir, Adleman) cryptography. Alternatively, a public key such as Hash-based Message Authentication Code (HMAC) may be used for signature. In the management system 50 using the authorization token, a signature is verified using a public key or a shared key depending on whether the authorization token is signed with a private key or a shared key. For the signature, a known standard such as JSON Web Signature (JWS) may be used. As necessary, the authorization token is encrypted by, for example, JSON Web Encryption (JWE).

The transmitter-receiver 41 transmits an authentication result including the issued authorization token to the terminal 10. The transmitter-receiver 11 of the terminal 10 receives the authentication result that includes the authorization token and is transmitted from the authentication server 40. Next, the transmitter-receiver 11 of the terminal 10 transmits the received authorization token as a login request to the management system 50 (step S28).

The transmitter-receiver 51 of the management system 50 receives the login request transmitted from the terminal 10. The token checker 52 of the management system 50 verifies the authorization token included in the login request (step S29). In this case, the token checker 52 analyzes the authorization token included in the login request according to a standard used in the communication system 1. The token checker 52 may determine whether the signature by the authentication server is valid based on the analysis result. When the signature by the authentication server is invalid, the token checker 52 determines that the authorization token in the login request has been tampered with and determines that the authorization has failed.

Next, the token checker 52 checks the expiration period included in the authorization token to determine whether the expiration period of the authorization token has expired. When the expiration period of the authorization token has expired, the token checker 52 determines that the authorization has failed.

Next, the token checker 52 determines whether the authorization token includes a service name corresponding to the management system 50. When the authorization token does not include a service name corresponding to the management system 50, the token checker 52 determines that the authorization has failed.

When the authorization by the token checker 52 fails at any one of the steps for verifying the signature, the expiration period, and the service name of the authorization token, the transmitter-receiver 51 transmits, to the terminal 10, authorization result information indicating that the authorization has failed. When all of the signature, the expiration period, and the service name of the authorization token are valid, the token checker 52 authorizes the user and the client indicated by the authorization token to use the service. When the user and the client are authorized, the management system 50 establishes a session with the terminal 10 (step S30). In this case, the management system 50 transmits, to the terminal 10, authorization result information indicating that the authorization has succeeded.

When the session is established, the management system 50 manages, in the storage 1000, the user name and the client name included in the authorization token and an IP address of the client in association with each other. This enables the management system 50 to identify the user name and the client name of a sender-side client without requiring the sender-side client to transmit the user name and the client name to the management system 50 each time the sender-side client transmits information.

In the descriptions of a process below, it is assumed that a terminal 10a (first communication terminal) has logged into the management system 50 using a user name "a" and a terminal 10b (second communication terminal) has logged into the management system 50 using a user name "b".

Figure 8:
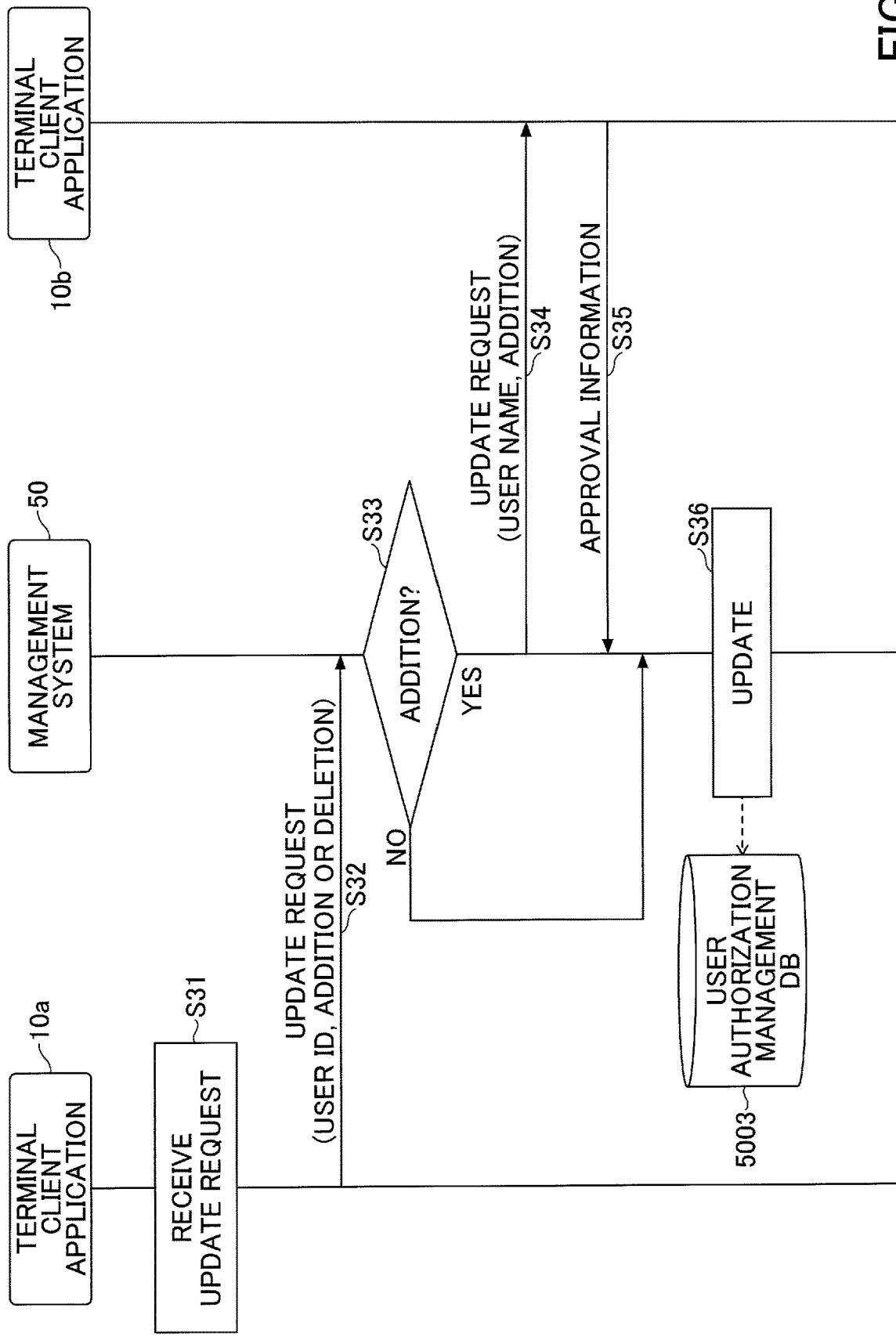
FIG. 8 is a sequence chart illustrating an example of a process for updating destination candidates that can be specified as destinations.

A process for updating destination candidates that can be specified as communication destinations is described with reference to FIG. 8. FIG. 8 is a sequence chart illustrating a process for updating destination candidates that can be specified as communication destinations. In the exemplary process described below, the terminal 10a requests an update of destination candidates. However, any other terminal 10 can also request an update of destination candidates through a similar process.

First, the operation input receiver 12 of the terminal 10a receives an update request entered by the user "a" to update destination candidates (step S31). When the update request is entered, the transmitter-receiver 11 of the terminal 10a transmits the update request to the management system 50 (step S32). The update request includes update information indicating addition or deletion of a destination candidate and a user name to be added or deleted. In the process of FIG. 8, one or more destination candidates may be added or deleted.

The transmitter-receiver 51 of the management system 50 receives the update request transmitted from the terminal 10a. When the update request is received, the transmitter-receiver 51 determines whether the update information in the update request indicates addition of a destination target (step S33). When the update information does not indicate addition (NO at step S33), the process proceeds to step S36.

When the update information indicates addition of an update candidate (YES at step S33), the transmitter-receiver 51 of the management system 50 transmits an update request to a terminal 10 that has logged into the management system 50 using the user name included in the update request (step S34). When the user name in the update request is "b", the transmitter-receiver 51 of the management system 50 transmits an update request to the terminal 10b that has logged into the management system 50 using the user name "b".

The transmitter-receiver 11 of the terminal 10b receives the update request transmitted from the management system 50. The operation input receiver 12 of the terminal 10b receives an approval for the update request from the user "b". When the approval is received, the transmitter-receiver 11 of the terminal 10b transmits approval information indicating approval of the update request to the management system 50 (step S35).

When receiving the approval information, the storage-reader 59 of the management system 50 updates the user authorization management table based on the update request (step S36). For example, when the update information in the update request indicates addition and the user name to be updated is "b", the storage-reader 59 adds the user name "a" of the requesting user "a" and right information "pub" to the user authorization management table in association with a topic name "Roster/userB" indicating messages for the user "b". As a result, it becomes possible to transmit messages from the user "a" to the user "b". Also, the storage-reader 59 adds the user name "b" of the user "b" and right information "pub" to the user authorization management table in association with a topic name "Roster/userA" indicating messages for the user "a". As a result, it becomes possible to transmit messages from the user "b" to the user "a". Table 1B illustrates an updated user authorization management table. In other words, when the user "a" transmits, to the management system 50, an update request to add the user "b" as a destination candidate, the user "a" is allowed to exchange information (messages) with the user "b". That is, the user "a" can exchange information (messages) with one or more destination candidates associated with the user "a".

TABLE 1B

| TOPIC NAME | USER NAME | RIGHT INFORMATION |
|---|---|---|
| Roster/userA | a | sub |
| Roster/userB | b | sub |
| Roster/userM | m | sub |
| Roster/userN | n | sub |
| Roster/userA | b, m | pub |
| Roster/userB | a, n | pub |
| Roster/userM | a | pub |
| Roster/userN | b | pub |

When the update information indicates deletion (NO at step S33), the storage-reader 59 searches the user authorization management table to find a topic name "Roster/userA" where information indicating the user "a" is written after "Roster", and deletes the user name included in the update request from user names associated with the found topic name. Also, the storage-reader 59 searches the user authorization management table to find a topic name where information indicating a user with the user name included in the update request is written after "Roster", and deletes the user name "a" of the user "a" from user names associated with the found topic name. In other words, when the user "a" transmits, to the management system 50, an update request to delete the user "b" from destination candidates, the user "a" becomes unable to exchange information (messages) with the user "b".

In the descriptions below, it is assumed that the user authorization management table is updated as indicated by Table 1B.

Figure 9:
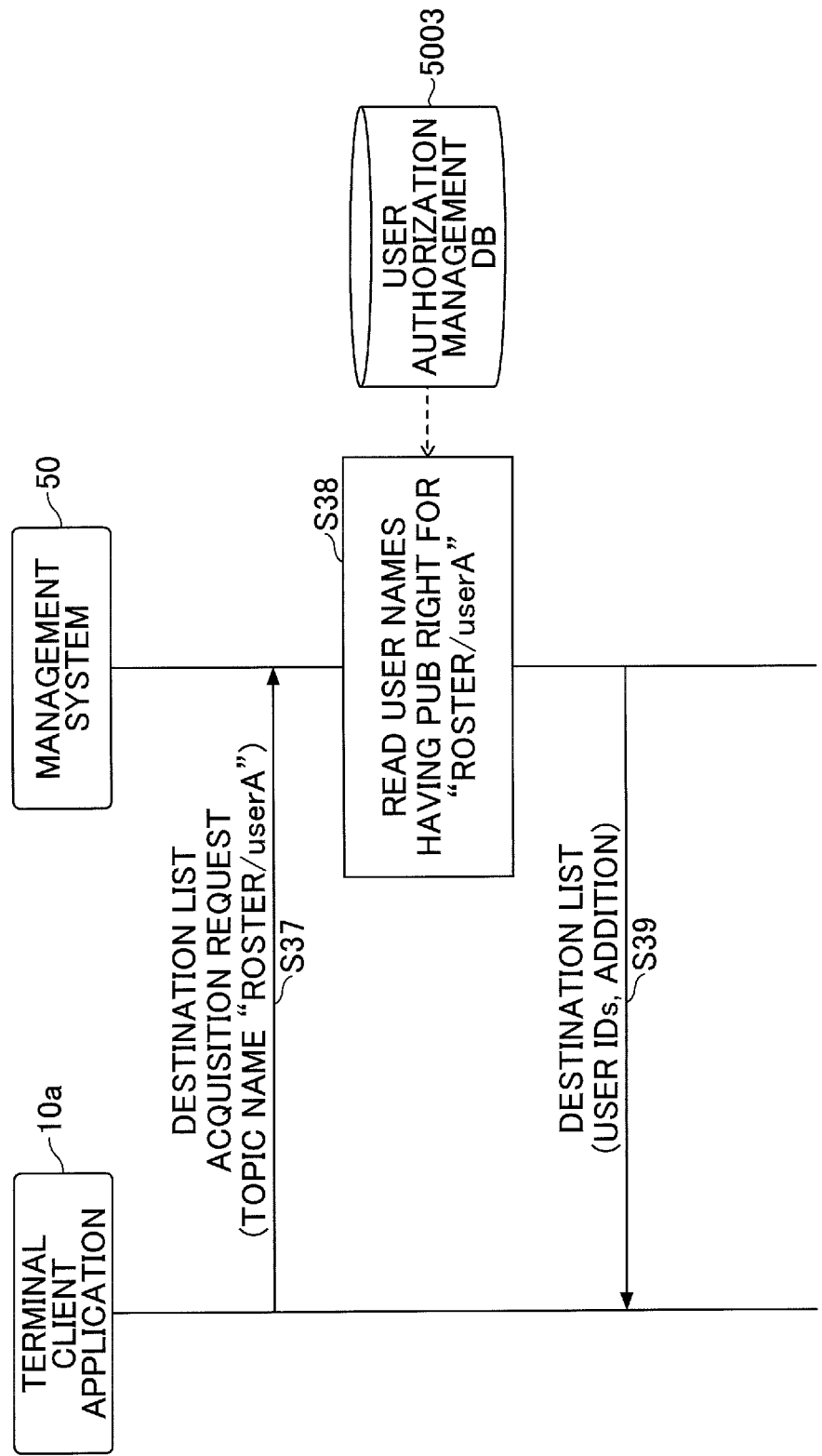
FIG. 9 is a sequence chart illustrating an example of a process for acquiring a destination list.

A process for acquiring a destination list including destination candidates that can be specified by the terminal 10 as communication destinations is described with reference to FIG. 9. FIG. 9 is a sequence chart illustrating a process for acquiring a destination list. In the exemplary process described below, the terminal 10a acquires a destination list. However, any other terminal 10 can also acquire a destination list through a similar process.

After the terminal 10a logs into the management system 50, the transmitter-receiver 11 of the terminal 10a transmits a destination list acquisition request to the management system 50 (step S37). The destination list acquisition request includes the topic name "Roster/userA" indicating messages for the user "a".

The transmitter-receiver 51 of the management system 50 receives the destination list acquisition request transmitted from the terminal 10a. The storage-reader 59 of the management system 50 searches the user authorization management table of Table 1B using a combination of the topic name "Roster/userA" included in the destination list acquisition request and right information "pub" as a search key. As a result of the search, the storage-reader 59 reads user names "b, m" of users who can transmit messages to the user "a" (step S38). As another example, the storage-reader 59 may search the user authorization management table using the user name "a" of the user "a" as a search key and read the corresponding topic names. In this case, the storage-reader 59 can acquire information on destination candidates to which the user "a" can transmit messages.

The transmitter-receiver 51 of the management system 50 transmits a destination list including the user names "b, m" read at step S38 to the terminal 10a requesting the destination list (step S39). Then, the transmitter-receiver 11 of the terminal 10a receives the destination list.

Figure 10:
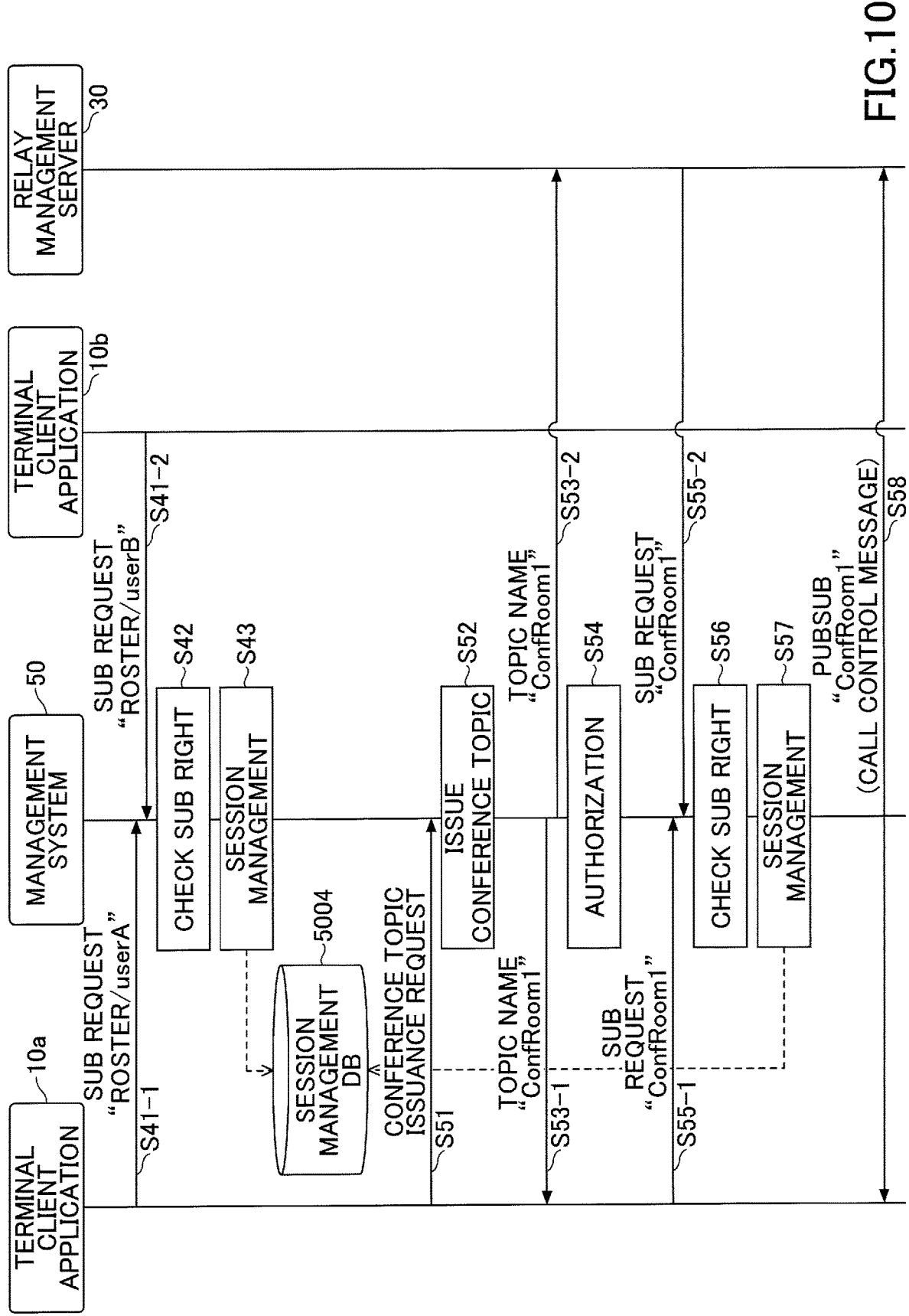
FIG. 10 is a sequence chart illustrating an example of a process for starting a video conference.

Next, a process for starting a video conference between the terminals 10a and 10b is described with reference to FIG. 10. FIG. 10 is a sequence chart illustrating a process for starting a video conference. In the exemplary process described below, a video conference is started between the terminals 10a and 10b. However, a video conference can also be started between other terminals 10 through a similar process.

In the process described below, it is assumed that a relay management server 30 is connected to the communication network 2 to be able to communicate with the terminals 10 and the management system 50, and manages relaying of content data between the terminals 10. The relay management server 30 is, for example, a video server, a multipoint control unit (MCU), or a SIP server. The hardware configuration of the relay management server 30 is substantially the same as that of the management system 50, and therefore its description is omitted here. Also, it is assumed that a relay management application of the relay management server 30 has logged into the management system 50 using a user name "z".

The pubsub request unit 15 of the terminal 10a transmits, to the management system 50, a sub request including the topic name "Roster/userA" indicating messages for the user "a" to receive messages for the user "a" (step S41-1). Similarly, the pubsub request unit 15 of the terminal 10b transmits, to the management system 50, a sub request including the topic name "Roster/userB" indicating messages for the user "b" to receive messages for the user "b" (step S41-2).

The transmitter-receiver 51 of the management system 50 receives the sub requests from the terminals 10a and 10b. The pubsub processor 53 of the management system 50 determines whether the user of each of the terminals 10a and 10b has a sub right corresponding to the sub request (step S42). In this step, the pubsub processor 53 determines, for each sub request, whether the combination of the topic name in the sub request, the user name of the sub-requesting user, and right information "sub" indicating a sub right exists in the user authorization management table of Table 1B. If the combination exists in the user authorization management table, the pubsub processor 53 determines that the user has the sub right corresponding to the sub request. If the combination does not exist in the user authorization management table, the pubsub processor 53 determines that the user does not have the sub right corresponding to the sub request. In the descriptions below, it is assumed that each user sending the sub request has the corresponding sub right.

The pubsub processor 53 registers, in the session management table, the user names "a" and "b" of the sub-requesting users in association with the topic names "Roster/userA" and "Roster/userB" in the corresponding sub requests (step S43). Table 2B illustrates a session management table after the registration.

TABLE 2B

| USER NAME | TOPIC NAME |
|---|---|
| ... | ... |
| a | Roster/userA |
| b | Roster/userB |
| ... | ... |

When the sub request is authorized, the transmitter-receiver 11 of the terminal 10a transmits a conference topic issuance request to the management system 50 to request the management system 50 to issue a topic related to a video conference that the user "a" is to join (step S51).

The transmitter-receiver 51 of the management system 50 receives the conference topic issuance request transmitted from the terminal 10a. When the conference topic issuance request is received, the pubsub processor 53 issues a topic related to the video conference that the user "a" is to join (step S52). As an example of a topic issuing method, the pubsub processor 53 generates a topic name "ConfRoom1" for identifying the video conference related to the request.

The transmitter-receiver 51 of the management system 50 transmits the topic name "ConfRoom1" of the issued topic to the requesting terminal 10a and the relay management server 30 (steps S53-1 and S53-2).

When the topic of the conference is issued, the pubsub processor 53 of the management system 50 authorizes the user "a" requesting the issuance of the topic and the user "z" of the relay management server 30 to perform publication and subscription for the issued topic (step S54).

In other words, the pubsub processor 53 authorizes the user "a" and the user "z" to publish messages for the topic with the topic name "ConfRoom1", and authorizes the user "a" and the user "z" to receive messages issued for the topic with the topic name "ConfRoom1". In this case, the pubsub processor 53 registers, in the user authorization management table, the topic name "ConfRoom1" of the issued topic, the user names "a, z" of the authorized users, and right information "pub, sub" indicating the pub and sub rights in association with each other. Table 10 illustrates a user authorization management table after the registration.

TABLE 1C

| TOPIC NAME | USER NAME | RIGHT INFORMATION |
|---|---|---|
| Roster/userA | a | sub |
| Roster/userB | b | sub |
| Roster/userM | m | sub |
| Roster/userN | n | sub |
| Roster/userA | b, m | pub |
| Roster/userB | a, n | pub |
| Roster/userM | a | pub |
| Roster/userN | b | pub |
| ConfRoom1 | a, z | pub, sub |

The transmitter-receiver 11 of the terminal 10a receives the topic name "ConfRoom1" transmitted from the management system 50 at step S53-1. The pubsub request unit 15 of the terminal 10a transmits, to the management system 50, a sub request including the topic name "ConfRoom1" and for subscribing the topic with the topic name "ConfRoom1" (step S55-1).

The relay management server 30 receives the topic name "ConfRoom1" transmitted from the management system 50 at step S53-2. The relay management server 30 transmits, to the management system 50, a sub request including the received topic name "ConfRoom1" and for subscribing the topic with the topic name "ConfRoom1" (step S55-2).

The transmitter-receiver 51 of the management system 50 receives the sub requests from the terminal 10a and the relay management server 30. The pubsub processor 53 of the management system 50 determines whether each sub-requesting user has a sub right to subscribe the topic indicated by the sub request (step S56). In this step, the pubsub processor 53 determines, for each sub request, whether the combination of the topic name "ConfRoom1" in the sub request, the user name "a" or "z" of the sub-requesting user, and right information "sub" indicating a sub right exists in the user authorization management table of Table 10. In this example, because the combination exists in the user authorization management table of Table 10, the pubsub processor 53 determines that each sub-requesting user has the sub right.

When each of the sub-requesting users has the sub right, the pubsub processor 53 registers, in the session management table, the user names "a" and "z" of the sub-requesting users in association with the topic name "ConfRoom1" included in the sub requests (step S57). Table 2C illustrates the session management table after the registration.

TABLE 2C

| USER NAME | TOPIC NAME |
| --- | --- |
| ... | ... |
| a | Roster/userA |
| b | Roster/userB |
| ... | ... |
| a | ConfRoom1 |
| z | ConfRoom1 |
| ... | ... |

The terminal 10a and the relay management server 30 publish call control messages of a session sed between the terminal 10a and the relay management server 30 for the topic with the topic name "ConfRoom1" and thereby exchange the call control messages (step S58). An example of this process is described below.

The pubsub request unit 15 of the terminal 10a transmits, to the management system 50, a pub request that includes the topic name "ConfRoom1" and includes, as a call control message, a request to relay content data of the terminal 10a. The transmitter-receiver 51 of the management system 50 receives the pub request transmitted from the terminal 10a.

The pubsub processor 53 of the management system 50 refers to the user authorization management table of Table 10 and determines whether right information "pub" indicating a pub right is being managed in association with the combination of the user name "a" of the pub-requesting user and the topic name "ConfRoom1" included in the pub request. Through this step, the pubsub processor 53 determines that the pub-requesting user has the pub right for the topic with the topic name "ConfRoom1" included in the pub request. When the pub-requesting user has the pub right, the pubsub processor 53 searches the session management table of Table 2C using the topic name "ConfRoom1" in the pub request as a search key and reads the corresponding user name "z". The pubsub processor 53 of the management system 50 transmits a call control message to the relay management server 30 that has logged into the management system 50 using the read user name "z".

When receiving a relay request transmitted from the management system 50, the relay management server 30 starts to relay image data and sound data from the terminal 10a to a specific terminal 10. As a result, the session sed is established between the terminal 10a and the relay management server 30 and the terminal 10a is enabled to start a video conference.

Figure 11:
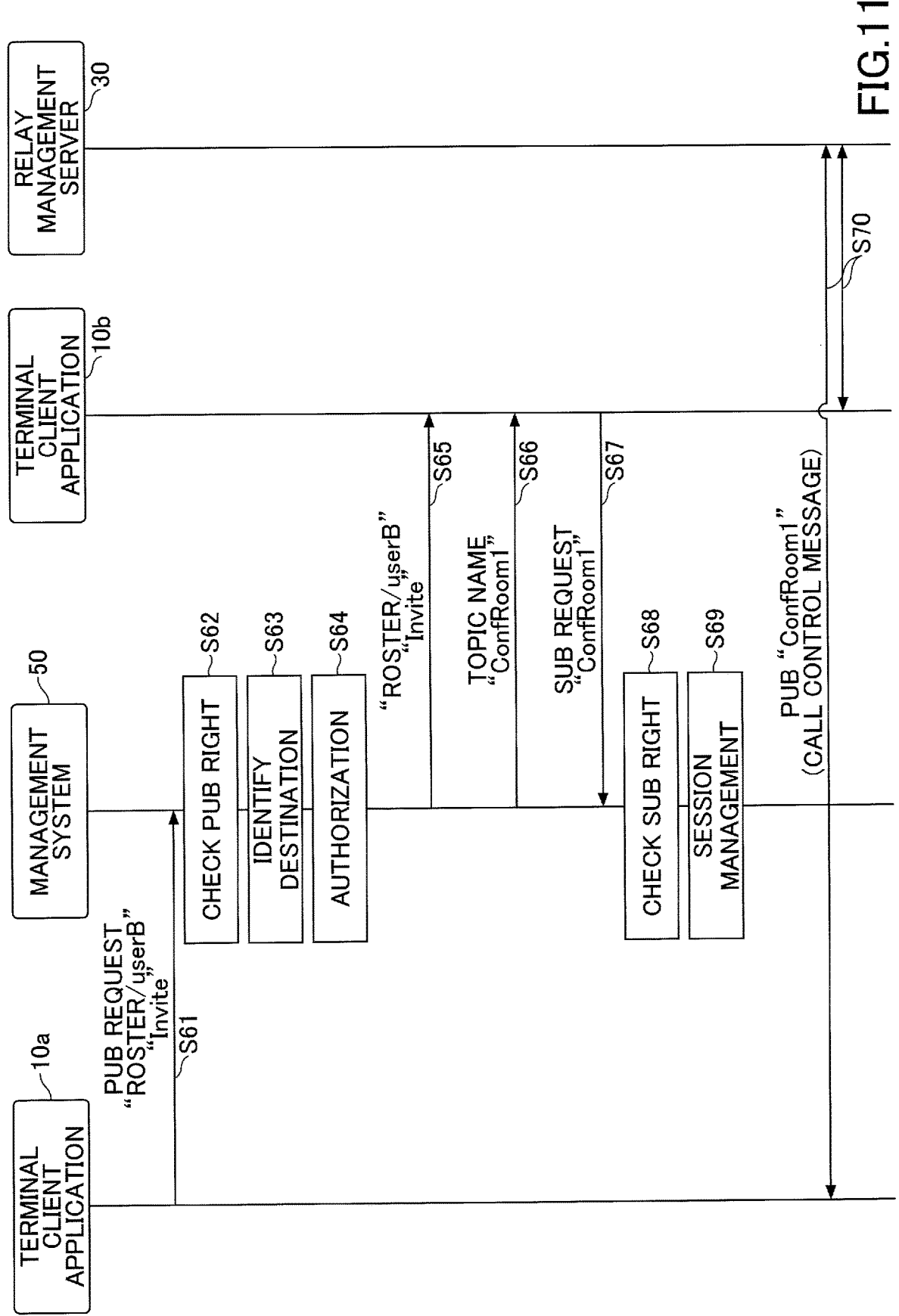
FIG. 11 is a sequence chart illustrating an example of a process for causing a terminal to join a session.

Next, a process for causing the terminal 10b to join the session sed for the video conference after the terminal 10a joins the session sed is described with reference to FIG. 11. FIG. 11 is a sequence chart illustrating an example of a process for causing a terminal 10 to join a session.

The pubsub request unit 15 of the terminal 10a transmits, to the management system 50, a pub request including a topic name "Roster/userB" indicating messages for the user "b" and a message "Invite" for inviting the user "b" to the conference (step S61). The transmitter-receiver 51 of the management system 50 receives the pub request transmitted from the terminal 10a.

The pubsub processor 53 of the management system 50 refers to the user authorization management table of Table 10 and determines whether right information "pub" indicating a pub right is being managed in association with the combination of the user name "a" of the pub-requesting user and the topic name "Roster/userB" included in the pub request (step S62). Through this step, the pubsub processor 53 determines whether the pub-requesting user has the pub right for the topic with the topic name "Roster/userB" included in the pub request.

When the pub-requesting user has the pub right, the pubsub processor 53 of the management system 50 searches the session management table of Table 2C using the topic name "Roster/userB" in the pub request as a search key and reads the corresponding user name "b". The pubsub processor 53 identifies the user "b" as the destination of the message "Invite" (step S63).

The pubsub processor 53 of the management system 50 authorizes the user "b" identified as the destination of the message "Invite" to publish and subscribe messages for the topic indicating the video conference that the pub-requesting user "a" joins (step S64). In this case, the pubsub processor 53 registers, in the user authorization management table, the topic name "ConfRoom1" of the topic, the user name "b" of the identified user "b", and right information "pub, sub" indicating the pub and sub rights in association with each other. Table 1D illustrates a user authorization management table after the registration.

TABLE 1D

| TOPIC NAME | USER NAME | RIGHT INFORMATION |
| --- | --- | --- |
| Roster/userA | a | sub |
| Roster/userB | b | sub |
| Roster/userM | m | sub |
| Roster/userN | n | sub |
| Roster/userA | b, m | pub |
| Roster/userB | a, n | pub |
| Roster/userM | a | pub |
| Roster/userN | b | pub |
| ConfRoom1 | a, b, z | pub, sub |

The pubsub processor 53 of the management system 50 transmits the topic name "Roster/userB" included in the pub request from the user "a" and the message "Invite" to the terminal 10b of the user "b" identified at step S64 (step S65). The transmitter-receiver 11 of the terminal 10b receives the topic name "Roster/userB" and the message "Invite" transmitted from the management system 50.

The transmitter-receiver 51 of the management system 50 transmits, to the terminal 10b of the user "b", the topic name "ConfRoom1" of the topic for which the user "b" is authorized to perform publication and subscription (step S66).

The transmitter-receiver 11 of the terminal 10b receives the topic name "ConfRoom1" transmitted from the management system 50. The pubsub request unit 15 of the terminal 10b transmits, to the management system 50, a sub request including the received topic name "ConfRoom1" and indicating a request to subscribe the topic with the topic name "ConfRoom1" (step S67).

The transmitter-receiver 51 of the management system 50 receives the sub request transmitted from the terminal 10b. Similarly to step S56, the pubsub processor 53 of the management system 50 determines whether the user "b" has a sub right to subscribe the topic with the topic name "ConfRoom1" (step S68).

When it is determined at step S68 that the user "b" has the sub right, the pubsub processor 53 registers, in the session management table, the user name "b" of the sub-requesting user in association with the topic name "ConfRoom1" included in the sub request (step S69). Table 2D illustrates a session management table after the registration.

TABLE 2D

| USER NAME | TOPIC NAME |
|---|---|
| ... | ... |
| a | Roster/userA |
| b | Roster/userB |
| ... | ... |
| a | ConfRoom1 |
| z | ConfRoom1 |
| b | ConfRoom1 |
| ... | ... |

The terminal 10a, the terminal 10b, and the relay management server 30 publish call control messages of the session sed for the topic with the topic name "ConfRoom1" and thereby exchange the call control messages (step S70). An example of this process is described below.

The pubsub request unit 15 of the terminal 10b transmits, to the management system 50, a pub request that includes the topic name "ConfRoom1" and includes, as a call control message, a join request to join the session sed. The transmitter-receiver 51 of the management system 50 receives the pub request transmitted from the terminal 10b.

The pubsub processor 53 of the management system 50 refers to the user authorization management table of Table 1D and determines whether right information "pub" indicating a pub right is being managed in association with the combination of the user name "b" of the pub-requesting user and the topic name "ConfRoom1" included in the pub request. Through this step, the pubsub processor 53 determines whether the pub-requesting user has the pub right for the topic with the topic name "ConfRoom1" included in the pub request. When the pub-requesting user has the pub right, the pubsub processor 53 searches the session management table of Table 2D using the topic name "ConfRoom1" in the pub request as a search key and reads the corresponding user names "a, b, z". The pubsub processor 53 of the management system 50 transmits a join request as a call control message to the terminal 10a and the relay management server 30 that have logged into the management system 50 using the read user names "a, z".

When the terminal 10a and the relay management server 30 receive and accept the join request, the terminal 10b joins the session sed. As a result, it becomes possible to start the video conference between the terminal 10a and the terminal 10b.

<<Variation A>>

Next, differences between the above embodiment and a variation B of the above embodiment are described.

At step S54, the pubsub processor 53 of the management system 50 authorizes, in addition to the requesting user "a" and the user "z" of the relay management server 30, destination candidates for communication with the user "a" to publish and subscribe messages for the topic for the video conference.

A method for identifying destination candidates for communication with the user "a" is described below. The management system 50 searches the user authorization management table of Table 1B using a combination of the topic name "Roster/userA" indicating messages for the user "a" and right information "pub" as a search key. The pubsub processor 53 identifies users "b" and "m" as destination candidates based on user names "b, m" read from the user authorization management table.

The pubsub processor 53 registers, in the user authorization management table, the topic name "ConfRoom1" indicating a video conference that the terminal 10a joins, user names "a, b, m, z" of users authorized at step S64, and right information "pub, sub" indicating the pub and sub rights in association with each other. Table 1E illustrates a user authorization management table after the registration.

TABLE 1E

| TOPIC NAME | USER NAME | RIGHT INFORMATION |
|---|---|---|
| Roster/userA | a | sub |
| Roster/userB | b | sub |
| Roster/userM | m | sub |
| Roster/userN | n | sub |
| Roster/userA | b, m | pub |
| Roster/userB | a, n | pub |
| Roster/userM | a | pub |
| Roster/userN | b | pub |
| ConfRoom1 | a, b, m, z | pub, sub |

In response to the authorization at step S64, the transmitter-receiver 51 of the management system 50 transmits the topic name "ConfRoom1" of the topic to the terminals 10 and the relay management server 30 that have logged into the management system 50 using the user names "a, b, m, z" of the authorized users "a", "b", "m", and "z" (step S66).

With the variation A, even when there are multiple users to be invited to a video conference, it is not necessary to transmit the message "Invite" to each of the users.

<<Variation B>>

Next, differences of a variation B from the above embodiment and the variation A are described.

At step S64, the pubsub processor 53 of the management system 50 authorizes, in addition to the invited user "b", destination candidates that can be specified by the user "b" to publish and subscribe messages for the topic for the video conference.

A method for identifying destination candidates that can be specified by the user "b" is described below. The management system 50 searches the user authorization management table of Table 10 using a combination of the topic name "Roster/userB" indicating messages for the user "b" and right information "pub" as a search key. The pubsub processor 53 identifies users "a" and "n" as destination candidates that can be specified by the user "b" based on user names "a, n" read from the user authorization management table.

The pubsub processor 53 registers, in the user authorization management table, the topic name "ConfRoom1" indicating a video conference that the terminal 10a joins, user names of users newly authorized at step S64, and right information "pub, sub" indicating the pub and sub rights in association with each other. Table 1F illustrates a user authorization management table after the registration.

TABLE 1F

| TOPIC NAME | USER NAME | RIGHT INFORMATION |
| --- | --- | --- |
| Roster/userA | a | sub |
| Roster/userB | b | sub |
| Roster/userM | m | sub |
| Roster/userN | n | sub |
| Roster/userA | b, m | pub |
| Roster/userB | a, n | pub |
| Roster/userM | a | pub |
| Roster/userN | b | pub |
| ConfRoom1 | a, b, m, n, z | pub, sub |

In response to the authorization at step S64, the transmitter-receiver 51 of the management system 50 transmits the topic name "ConfRoom1" of the topic to terminals 10 that have logged into the management system 50 using the user names of the newly-authorized users (step S66).

With the variation B, even when there are multiple users to be invited to a video conference, it is not necessary to transmit the message "Invite" to each of the users.

Major Effects of Present Embodiment

Next, major effects of the above embodiment are described. According to the information transmission method of the above embodiment, the management system 50 (an example of an information transmission system) enables users (examples of accounts), who are authorized to publish (an example of "transmit") call control messages (an example of information), to exchange messages. In response to a conference topic issuance request (an example of a request to start a session) made by a first account, the pubsub processor 53 (an example of an authorization unit) of the management system 50 authorizes the first account to perform publication (an example of message transmission). Also, in response to a request to invite a second account (an example of a request to cause the second account to join a session), the pubsub processor 53 authorizes the second account to perform publication (an example of message transmission). This configuration makes it possible to authorize a new account to perform message transmission during a session where messages are exchanged between accounts.

The user authorization management DB 5003 (an example of a management unit) of the management system 50 manages one or more user names (an example of destination information) indicating destination candidates associated with the first account. In response to a request made by the first account to invite second accounts, the pubsub processor 53 of the management system 50 authorizes the destination candidates with the user names to perform publication (transmission of information). With this configuration, even when there are multiple second accounts to be invited to a session, it is possible to enable the second accounts to join the session without transmitting an invitation message to each of the second accounts.

The user authorization management DB 5003 of the management system 50 manages one or more user names indicating destination candidates associated with the second account. In response to a request made by the first account to invite the second account, the pubsub processor 53 of the management system 50 authorizes the destination candidates indicated by the user names to perform publication (transmission of information). With this configuration, even when there are multiple second accounts (other accounts) to be invited to a session, it is possible to enable the second accounts to join the session without transmitting an invitation message to each of the second accounts.

In response to a conference topic issuance request, the pubsub processor 53 (an example of a generation unit) of the management system 50 issues (an example of "generate") a topic corresponding to a video conference session. In response to a conference topic issuance request made by a first account, the pubsub processor 53 of the management system 50 authorizes the first account to perform publication and subscription for the topic. Also, in response to a request to invite a second account, the pubsub processor 53 authorizes the second account to perform publication and subscription for the topic. In other words, in response to a conference topic issuance request, the pubsub processor 53 may authorize the first account to publish messages for a generated topic and to receive messages published for the generated topic. Also, in response to a request made by the first account to invite the second account, the pubsub processor 53 authorizes the second account to publish messages for the generated topic and to receive messages published for the generated topic. This configuration makes it possible to authorize a new account to transmit information during a session where messages are exchanged between accounts.

The user authorization management DB 5003 of the management system 50 manages, in association with a topic indicating a first account, user names (an example of identification information) of second accounts authorized to publish messages for the topic. The transmitter-receiver 11 (an example of a transmission unit) of the management system 50 transmits, to the first account, the user names of the second accounts being managed by the user authorization management DB 5003. This configuration makes it possible to manage destination candidates using the user authorization management DB 5003 and thereby makes it possible to reduce the load of the management system 50 in separately managing a destination list.

The transmitter-receiver 51 (an example of a reception unit) of the management system 50 receives, from a first account, a request to add a second account as a destination candidate. In response to the request to add the second account, the storage-reader 59 (an example of an addition unit) of the management system 50 adds the user name of the second account related to the request to the user authorization management DB 5003 in association with a topic indicating the first account. With this configuration, the management system 50 can update destination candidates of the first account.

The transmitter-receiver 51 (an example of a reception unit) of the management system 50 receives a request to delete a second account from one or more destination candidates associated with a first account. In response to the request to delete the second account, the storage-reader 59 (an example of a deletion unit) of the management system 50 deletes the user name of the second account that is associated with a topic indicating the first account in the user authorization management DB 5003. With this configuration, the management system 50 can update destination candidates of the first account.

Supplementary Descriptions of Embodiments

Each of programs for the terminal 10, the authentication server 40, and the management system 50 may be stored as an installable and executable file in a computer-readable recording medium (e.g., the recording medium 106) for distribution. Other examples of the recording medium include a compact disk recordable (CD-R), a digital versatile disk (DVD), and a Blu-ray disk.

A recording medium such as a CD-ROM storing programs of the above embodiment and the HD 504 storing the programs may be supplied as program products to domestic and foreign markets.

Each of the terminal 10, the authentication server 40, and the management system 50 in the above embodiment may be implemented by a single computer or multiple computers to which its functional components are distributed. Also, the authentication server 40 and the management system 50 may be implemented by a single computer.

Each of the functional components described in the above embodiment may be implemented by one or more processing circuits (or processing circuitry). Examples of "processing circuits" in the present application include a processor including electronic circuits and programmed to execute various functions according to software and a device such as an application specific integrated circuit (ASIC) or a circuit module designed to execute various functions described above.

The information transmission system according to the above embodiment may be implemented by a device memory storing one or more programs and one or more processors. The one or more processors execute the one or more programs to perform processes described in the embodiment. For example, the device memory and the one or more processors can realize (implement) functions as described in the embodiment. For example, the device memory and the one or more processors may be realized (implemented) by hardware components as described in the embodiment.

A conference system, an information transmission method, and a storage medium according to embodiments of the present invention are described above. However, the present invention is not limited to the specifically disclosed embodiments, and variations and modifications may be made without departing from the scope of the claims.

What is claimed is:

1. A conference system, comprising:
a management system connected via a network to a first communication terminal and a second communication terminal,
wherein the management system includes a processing circuitry configured to
generate a topic in response to a conference topic issuance request made by a first user to hold a conference between the first communication terminal and the second communication terminal,
authorize the first user to perform publication and subscription for the topic in response to the conference topic issuance request made by the first user,
authorize a second user to perform publication and subscription for the topic in response to an invitation request made by the first user to invite the second user to the conference, the invitation request including a topic name indicating a message for the second user,
manage destination information indicating one or more destination candidates associated with the first user, and
authorize the one or more destination candidates indicated by the destination information to transmit information in response to the conference topic issuance request made by the first user.

2. The conference system as claimed in claim 1, wherein the processing circuitry is configured to
manage destination information indicating one or more destination candidates associated with the second user; and
authorize the one or more destination candidates indicated by the destination information and associated with the second user to transmit information in response to the invitation request made by the first user to invite the second user to the conference.

3. The conference system as claimed in claim 2, wherein the processing circuitry is configured to
manage, in association with the topic indicating the first user, identification information of the second user authorized to perform publication for the topic; and
transmit, to the first user, the identification information of the second user.

4. The conference system as claimed in claim 3, wherein the processing circuitry
is configured to
receive a request to add the second user as a destination candidate; and
add, in response to the request to add the second user, the identification information of the second user to a management table in association with the topic indicating the first user.

5. The conference system as claimed in claim 4, wherein the processing circuitry is configured to
receive a request to delete the second user from the one or more destination candidates associated with the first user; and
delete, in response to the request to delete the second user, the identification information of the second user from the management table.

6. The conference system as claimed in claim 1, wherein
in response to the conference topic issuance request made by the first user to hold the conference, the processing circuitry authorizes the first user to publish a message for the topic and to receive a message published for the topic; and
in response to the invitation request made by the first user to invite the second user to the conference, the processing circuitry authorizes the second user to publish a message for the topic and to receive a message published for the topic.

7. A method performed by a conference system including a management system connected via a network to a first communication terminal and a second communication terminal, the method comprising:
generating a topic in response to a conference topic issuance request made by a first user to hold a conference between the first communication terminal and the second communication terminal;
authorizing the first user to perform publication and subscription for the topic in response to the conference topic issuance request made by the first user;

authorizing a second user to perform publication and subscription for the topic in response to an invitation request made by the first user to invite the second user to the conference, the invitation request including a topic name indicating a message for the second user;

managing destination information indicating one or more destination candidates associated with the first user; and authorizing the one or more destination candidates indicated by the destination information to transmit information in response to the conference topic issuance request made by the first user.

8. A non-transitory computer-readable storage medium storing a program for causing a conference system to execute a process, the conference system including a management system connected via a network to a first communication terminal and a second communication terminal, the process comprising:

generating a topic in response to a conference topic issuance request made by a first user to hold a conference between the first communication terminal and the second communication terminal;

authorizing the first user to perform publication and subscription for the topic in response to the conference topic issuance request made by the first user;

authorizing a second user to perform publication and subscription for the topic in response to an invitation request made by the first user to invite the second user to the conference, the invitation request including a topic name indicating a message for the second user;

managing destination information indicating one or more destination candidates associated with the first user; and authorizing the one or more destination candidates indicated by the destination information to transmit information in response to the conference topic issuance request made by the first user.

* * * * *